United States Patent [19]

McCool

[11] Patent Number: 6,070,724

[45] Date of Patent: Jun. 6, 2000

[54] PACKAGE WITH HOLOGRAPHIC IMAGE GENERATING DECAL

[75] Inventor: Gregory F. McCool, Staunton, Va.

[73] Assignee: American Safety Razor, Verona, Va.

[21] Appl. No.: 09/286,990

[22] Filed: Apr. 7, 1999

[51] Int. Cl.[7] .............................. G03H 1/28; A45C 11/26
[52] U.S. Cl. ...................... 206/352; 206/457; 206/459.1; 206/806; 359/2; 359/24
[58] Field of Search ..................................... 206/352–358, 206/461, 459.1, 459.5, 806, 457; 359/2, 22, 24; 40/312, 453, 454; 53/507, 131.2

[56] References Cited

U.S. PATENT DOCUMENTS

| | | |
|---|---|---|
| D. 349,596 | 8/1994 | Booth . |
| D. 363,079 | 10/1995 | Wai Keong . |
| D. 372,285 | 7/1996 | Fortini . |
| 5,130,825 | 7/1992 | Kok-Schram De Jong . |
| 5,142,384 | 8/1992 | Wood et al. . |
| 5,162,927 | 11/1992 | Moss et al. ................................ 359/22 |
| 5,214,425 | 5/1993 | Wreede ..................... 359/24 |
| 5,222,642 | 6/1993 | Solarz . |
| 5,223,357 | 6/1993 | Lovison . |
| 5,280,385 | 1/1994 | Wybrow . |
| 5,282,066 | 1/1994 | Yu et al. .................................... 359/24 |
| 5,367,801 | 11/1994 | Ahn . |
| 5,411,296 | 5/1995 | Mallik ......................................... 359/2 |
| 5,421,583 | 6/1995 | Gluck . |
| 5,525,383 | 6/1996 | Witkowski . |
| 5,636,741 | 6/1997 | O'Keefe . |
| 5,647,151 | 7/1997 | Fantone et al. . |
| 5,706,106 | 1/1998 | Monaghan . |
| 5,718,336 | 2/1998 | Haarlander . |

Primary Examiner—Paul T. Sewell
Assistant Examiner—Luan K. Bui
Attorney, Agent, or Firm—McDermott, Will & Emery

[57] ABSTRACT

In order to depict features such as pivoting and/or the flexure of elements of an article or articles which are enclosed within a package, at least one holographic generating layer is disposed on the package to provide an enlarged highlighted view of a portion of an image which is printed on the surface of the package. In accordance with the invention, it is also possible to have two holographic image generating layers overlaid one on the other and adhered to the surface of a package. The outer layer permit the images produced by the underlying layer to be also viewed, although at different angles from the images produced by the upper or outer layer. This permits the simulation of different movements which are exhibited by the article or articles enclosed within the package.

5 Claims, 3 Drawing Sheets

PACKAGE WITH HOLOGRAPHIC IMAGE GENERATING DECAL

BACKGROUND OF THE INVENTION

1. Field of the Invention

The present invention relates generally to packages and more specifically to a package which is adapted for display and which features a holographic display portion which demonstrates changes that occur when the enclosed item or items, are used.

2. Description of the Related Art

Various holographic image display arrangements have been proposed for use with packaging and the like. One example of such proposals is found in U.S. Pat. No. 5,636, 741 issued on Jun. 10, 1997 in the name of O'Keefe. This arrangement is such as to present the images in response to the pivoting of an image bearing member within the container. This arrangement of course has suffered from the drawback that the images must be separate from the container and located so as to be visible through an opening which is located at a distance from the axis about which the image bearing member is supported.

In order to improve on such an arrangement, it has been proposed to used a holographic effect wherein the image appears to change depending on the angle at which the viewer views the image. By way of example, U.S. Pat. No. 5,142,384 issued on Aug. 25, 1992 in the name of Wood et al., discloses the use of a light transparent visual display feature which produces a first image when viewed at a first angle and then produces a second image which is different from the first when viewed at a second angle.

In this arrangement the holographic member is disposed on a transparent window of the package so that the two images, which are produced by the holographic member are superimposed on the image of an actual article which is stored in the package and which is visible to the viewer through the window.

This arrangement of course eliminates the need for manually moving members from one position to another while providing an eye-catching effect. Nevertheless, there remains a need for a more dynamic type of image producing effect which can be applied to packages, without the need to provide transparent windows and to precisely arrange and carefully maintain a single article suspended in a predetermined position with respect to the transparent window and holographic layer so that the desired effect, wherein various movements which are possible with the article or articles, can be demonstrated to the consumer and thus enable the advantages/merits/features of the product to be demonstrated to the potential purchaser.

SUMMARY OF THE INVENTION

The present invention basically resides in a holographic label or decal for a package which is combined with a printed image on the surface of a container or package in a manner that provides at least first and second views of what appears to the viewer as a magnified spotlighted portion of the printed image. When viewed sequentially, these views produce a visual effect which shows a element of printed image, moving between non-displaced and displaced states, respectively. In the event of a double holographic image generating layer arrangement, this effect enables the viewer to perceive two distinct types of motion with respect to the same basic image and thus become cognizant of different features of the product which is illustrated on the package.

In a specific embodiment of the invention, the image takes the form of a razor cartridge which is pivotally mounted on a razor handle so as be pivotal within a predetermined angle and thus adjust to the curvature of the face as the razor is drawn along the surface of the skin. In addition to this pivotal motion, the blades are arranged to flex in a manner which facilitates the whisker cutting action thereof. In this embodiment, it is one or both of these two different motions which are simulated by the holographic layers. While the invention is clearly not limited to these two particular motions, and can be applied to any number of other combinations, the merit and utility of the invention is believed to be adequately illustrated by this particular example.

More specifically, a first embodiment of the invention resides in a package containing an article, and which comprises a printed image of the article on a major flat surface of the package and a holographic decal overlaying part of the printed image. The holographic decal includes a holographic image generating layer which produces first and second images when viewed at first and second angles. The first image is so arranged as to be either essentially identical with or an apparent enlargement of that portion of the printed image that is overlaid by the decal. With this the overlaid portion of the image appears to be visible through a lens or window defined by the decal. The second image is arranged so that it shows an element of the printed image displaced and such that repeated sequential views of the first and second images produces an optical effect which demonstrates one of a flexure and a tilting action (for example) possible with the article enclosed in the package.

The above arrangement is such that the decal can further includes a second holographic image generating layer which produces third and fourth images. This second holographic image generating layer overlays the first holographic layer in a manner wherein the third and fourth images can be seen when respectively viewed at third and fourth angles which are different from the first and second angles. The third image is essentially identical with or an enlargement of that portion of the printed image that is overlaid by the decal, so that the overlaid portion of the image appears to be visible through the window or lens like structure defined by the decal. The fourth image shows that portion of the article which is overlaid by the decal displaced (e.g. pivoted) in its entirety to a new position. With this arrangement repeated sequential views of the third and fourth images produce an optical effect that demonstrates the other of the flexure and tilting action possible with the article enclosed in the package.

A second aspect of the invention resides in a package for enclosing a product at least a part of which moves during its operation/use. This package has a first holographic image generating layer affixed to a surface of the package. This first holographic image generating layer produces first and second images which simulate a first type of movement that is produced by the product during its use. The first and second images are viewable from first and second angles, respectively. The package further has a second holographic image generating layer overlaid on the first holographic image generating layer. This second holographic image generating layer produces third and fourth images which simulate a second type of movement that is produced by the product during its use, the third and fourth images being viewable from third and fourth angles. The second holographic image generating layer is transparent so that the first and second images, which are produced by the first holographic image generating layer, are visible through the second holographic image generating layer.

In this aspect of the invention the product comprises a razor cartridge having at least one razor blade. In the first position the at least one razor blade is in a non-flexed state while in the second state the at least one razor blade in a flexed state. Alternatively, the product in the first position takes the form of a razor cartridge in a first pivoted position while the second position takes the form of a razor cartridge in a second pivoted position.

A second aspect of the invention resides in a housing for a device that exhibits first and second types of movement during normal operation, which comprises a first holographic image affixed to the container; and a second holographic image superimposed on the first holographic image such that the device is depicted as exhibiting a first movement when viewed sequentially viewed from first and second angles, and exhibiting a second movement when viewed sequentially from third and fourth angles.

In accordance with this aspect of the invention the container is adapted to contain a device in the form of a razor cartridge having at least one razor blade. When seen from the first angle the at least one razor blade is shown in a non-flexed state while seen from the second angle the at least one razor blade is shown in a flexed state.

Alternatively, the device can be the razor cartridge as whole wherein the first position is the razor cartridge in a first pivoted position while second position is the razor cartridge in a second pivoted position.

A yet further aspect of the invention resides in a method of packaging a product comprising the steps of: printing an image of the product which is enclosed in the package on a surface of the package; placing a holographic decal which has a first holographic layer over a portion of the image; using the decal to generate first and second images which appear to be enlargements of the portion of the image over which the decal is disposed; configuring the decal so that the first image appears as an enlarged depiction of the portion of the image which is covered by the decal in a first state; configuring the decal so that the second image appears as an enlarged depiction of the portion of the image which is covered by the decal in a second state which is different from the first state and wherein a positional relationship of at least one element of the second image has occurred with respect to a position of that element in the first image.

This method further comprises the steps of: configuring the holographic decal to have a second holographic layer which overlays the first holographic layer; configuring the second holographic layer to generate third and fourth images which are different from the first and second images and which are viewable at third and fourth angles which are different from the first and second angles at which the first and second images produced by the first holographic layer are viewable; configuring the third and fourth images so that they depict a movement of an element or elements which is different from the movement which appears from sequential viewings of the first and second images.

A still further aspect of the invention resides in a method of packaging a product comprising the steps of: placing a decal on a surface of the package; and configuring the decal to comprise first and second overlaid holographic layers which are respectively configured to generate first and second pairs of images.

In this method the sequentially viewing the first pair of images imparts an optical impression of a first change in configuration of a predetermined structure; and sequentially viewing the second pair of images imparts an optical impression of a second change in the configuration of the predetermined structure which is different from the first change.

Another aspect of the invention resides in a package comprising: decal on a surface of the package, the decal comprising: first and second overlaid holographic layers which are respectively configured to generate first and second pairs of images. In this arrangement, when sequentially viewed, the first pair of images are such as to impart an optical impression of a first change in configuration of a predetermined structure; while when sequentially viewed, the second pair of images impart an optical impression of a second change in the configuration of the predetermined structure which is different from the first change.

BRIEF DESCRIPTION OF THE DRAWINGS

The various features, aspects and advantages of the present invention will become more apparent as a detailed description of the preferred embodiments is given with reference to the appended drawings in which.

DETAILED DESCRIPTION OF THE PREFERRED EMBODIMENTS

Figure 1:
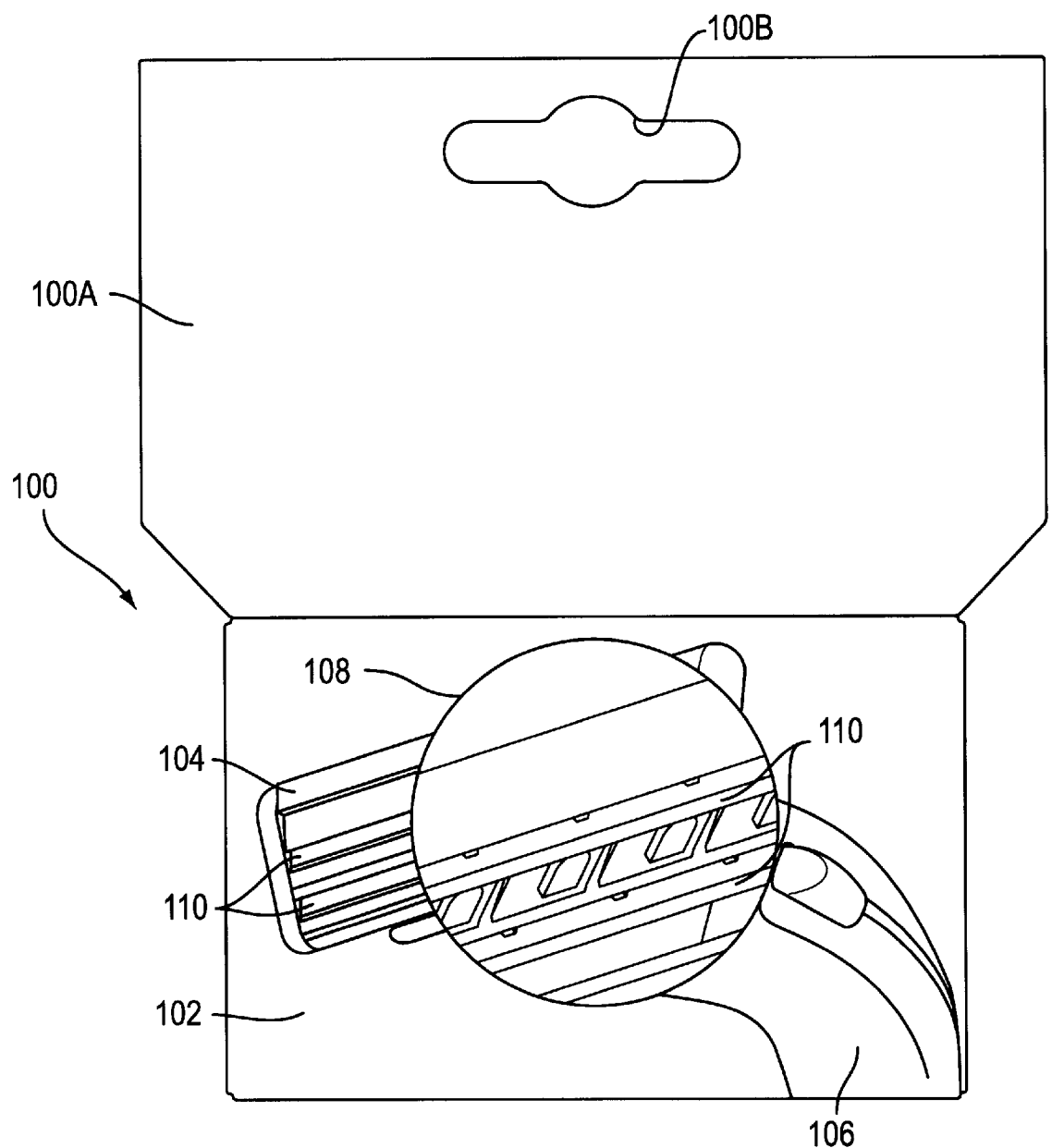
FIG. 1 is a front view of a package which is equipped with a holographic decal according to the present invention, and wherein the hologram is viewed from a first angle so as to provide the viewer with a image wherein the elements of the item depicted are not distorted.
Figure 2:
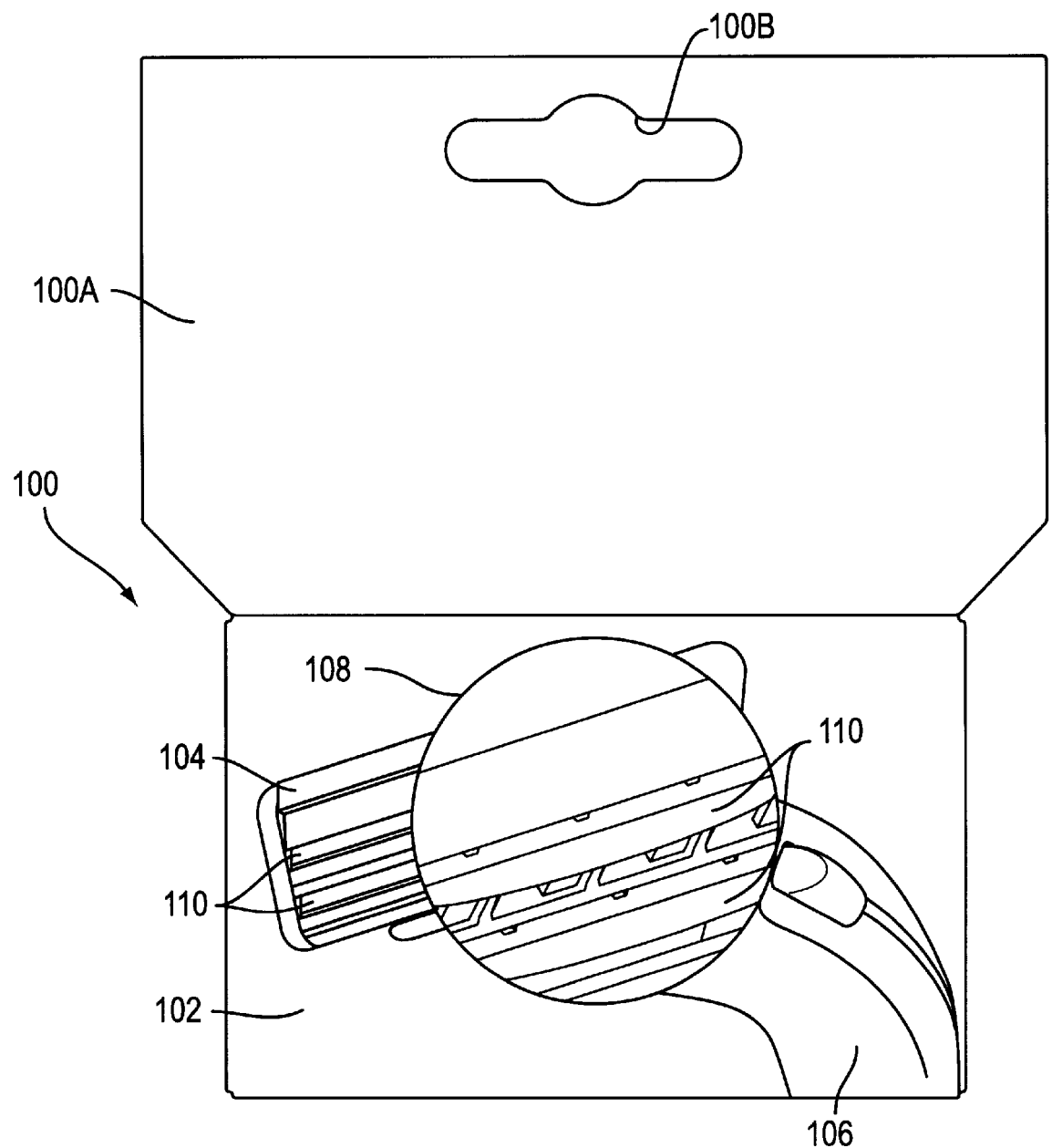
FIG. 2 is a front view of a package which is equipped with a holographic decal according to the present invention, and wherein the hologram is viewed from a second angle so as to provide the viewer with a image wherein the elements of the item depicted are flexed or distorted.
Figure 3:
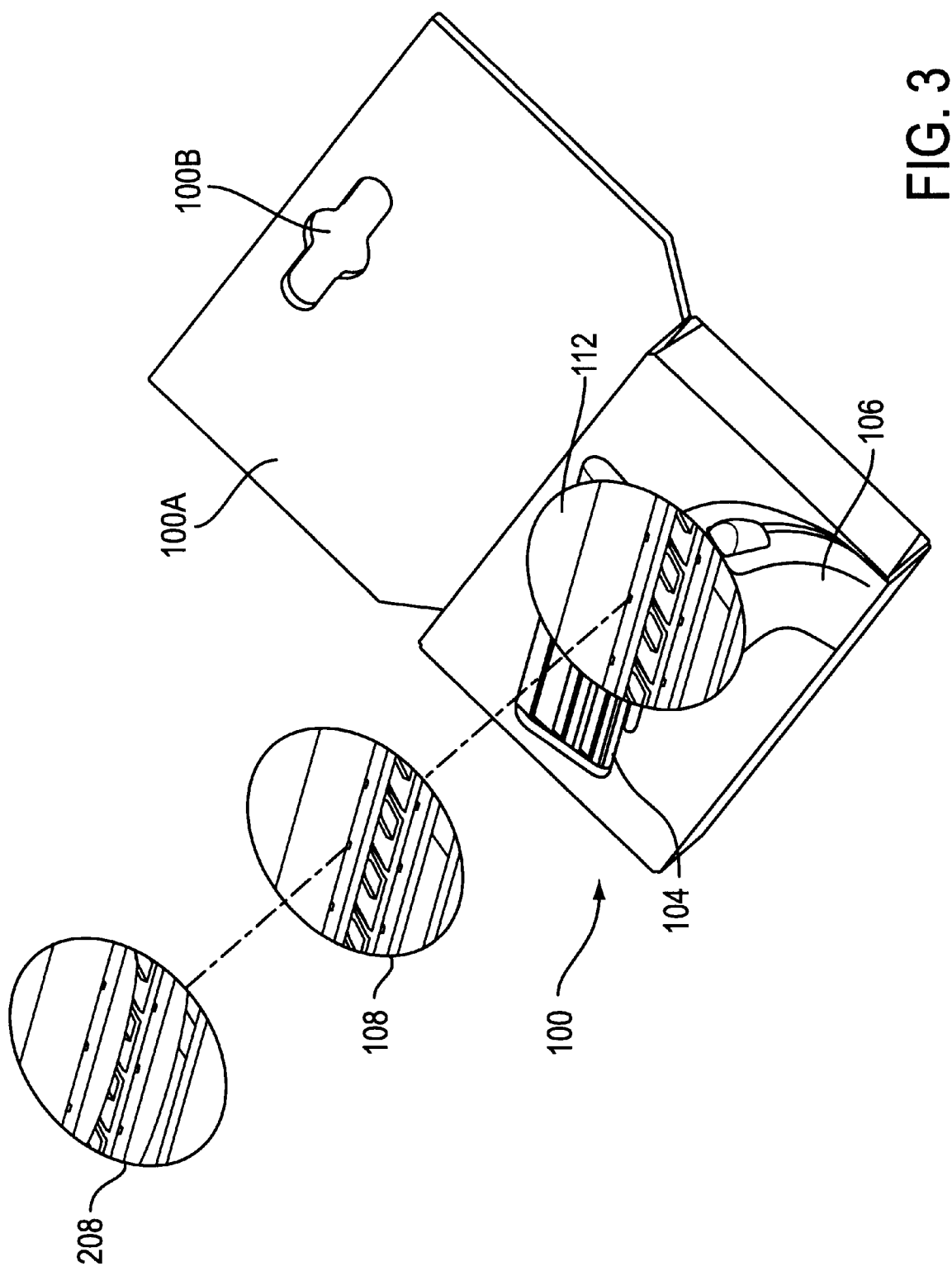
FIG. 3 is a perspective view showing the use of dual hologram layers which are disposed one on the other in a manner which enables the viewer to see two different types of change in the orientation/arrangement of the elements of the item which are depicted on the cover of the package.

FIGS. 1 to 3 depict a package which is exemplary of that to which the embodiments of the invention are applicable. In this case, the package takes the form of a folded cardboard container 100 in which a set of replacement razor cartridges (by way of example only), are disposed.

The outer surface of the package is at least in part covered with a printed layer 102 which depicts one of the razor cartridges 104 that are enclosed in the package 100, mounted on a handle 106 ready for shaving. The package 100, in this embodiment, is provided with a hanger portion 100A in which a suitably shaped opening 100B is formed to facilitate hanging on projecting members provided on display areas of supermarkets and the like. The relatively large surface area of the hanger portion 100B of course can be covered with advertising copy, logos and the like.

A holographic decal 108 is adhered atop of the printed image of the cartridge. This decal comprises in its simplest form comprises a single holographic image generating layer. In this embodiment, the layer 108 is arranged to produce a first image (shown in FIG. 1) which has at least one surface or edge that is generally aligned with a corresponding surface or edge of the printed image so as to provide visual continuity with the printed image which is located immediately adjacent thereto. The second image which is produced by the layer (shown in FIG. 2) is one wherein deformation of one or more of the elements (in this case the blades) which comprise the article, are shown in manner which demonstrates a desirable effect/feature of the article.

The images which are produced by the layer 108, in this embodiment, are both enlarged spot-lighted type images.

More specifically, the images which are generated by the layer 108 are, in this embodiment, such as produce an effect which simulates the views which would be observed through a hand-held circular magnifying glass of a portion of the printed image on the printed layer 102 which is covered with the decal, in normal and operative states.

In more specific terms, the second image which produced by the holographic decal and which is shown in FIG. 2, is different from the first image which is depicted as being produced by the decal in FIG. 1. In this instance, the blades which form part of the razor cartridge that is printed on the front of the package 100 are shown in normal and flexed states (FIGS. 1 and 2 respectively). This of course permits a potential purchaser to appreciate an important feature of the product which is contained in the package without actually seeing the product or article per se, and thus increases the buyers understanding of what is being purchased. In this particular case, the flexure of the blades 110 which improve the shaving experience are demonstrated as if being viewed through a magnifying glass thus producing the above-mentioned spotlighting effect.

It should be appreciated that the enlargement of the portion of the image which is presented in the holographic decal is both effective from the point of increasing the amount of movement which is observed as the line of observation shifts from the angle at which the first image is perceived to that at which the second image can be observed, as well as enabling sufficient detachment from the image printed on the surface of the container, as to avoid an immediate reaction to the discontinuity between the movement which is produced by the holographic decal and the lack of any corresponding movement in the printed image.

Nevertheless, it should be understood that the present invention is not limited to the use of a single holographic decal and that it is possible to apply more than one layer in order to achieve the desired effect. For example, as shown in exploded form in FIG. 3, it is possible to overly two decals 108, 208 one on the other and configure the decals so that a total of four images (two pairs) can be seen by the viewer when viewed at four different angles. The second decal 208 can be arranged to show a tilting motion of the cartridge with respect to the handle, for example. Further, the second decal can, and is preferably, such as to produce spotlighted (enlarged) images of the portion of the printed image which is overlaid for the above reasons of avoiding obvious discontinuity between the holographic image and the printed image and to demonstratively magnify the amount of movement which is produced.

The provision of further decals is not prohibited. For example, more than one part of the printed image can be overlaid and can be thus subjected to the same type of demonstrative process as is possible with the illustrated embodiments.

In this embodiment, as a safeguard, an image 112 which is essentially similar to the first image produced by the first holographic decal 108 can be printed as part of the printed image. With this provision, in the worst case, should the decal or decals 108, 208 accidentally come off the package 100, the package will still have a semblance of its intended appearance and still exhibit some marketability.

While the invention is not limited to the type of product which is illustrated, it does find particular application therewith. The obvious variants which can be developed without deviating from the scope of the invention will be, in light of the preceding disclosure and appended drawings, essentially self-evident to the person skilled in the art to which the present invention pertains.

What is claimed is:

1. A package for housing a product which moves during operation, the package comprising:

a first holographic image generating layer affixed to a surface of the package, said first holographic image generating layer producing first and second images which simulate a first type of movement that is produced by the product during its use, the first and second images being viewable from first and second angles, respectively;

a second holographic image generating layer overlaid on the first holographic image generating layer, said second holographic image generating layer producing third and fourth images which simulate a second type of movement that is produced by the product during its use, the third and fourth images being viewable from third and fourth angles, said second holographic image generating layer being transparent so that the first and second images, which are produced by the first holographic image generating layer, are visible through the second holographic image generating layer;

wherein the package is formed of an opaque material, and has a printed image on the surface of the package illustrating the product which is concealed within the package, and wherein the first and second holographic image generating layers are disposed on a part of the printed image.

2. A package containing an article, said package comprising:

a printed image of the article on a major flat surface of the package;

a holographic decal overlaying part of the printed image, the holographic decal having a holographic image generating layer which produces at least first and second images when viewed at first and second angles, the first image being so arranged as to be essentially identical with that portion of the printed image that is overlaid by the decal or an enlargement of the portion of the image, so that the overlaid portion of the image appears to be visible through one of a lens and a window defined by the decal, the second image being arranged so that it shows an element of the printed image displaced such that repeated sequential views of the first and second images produces an optical effect which demonstrates one of a flexure and a tilting action possible with the article enclosed in the package.

3. A package as set forth in claim 2, wherein the decal further includes a second holographic image generating layer which produces third and fourth images, the second holographic image generating layer overlaying the first holographic layer in a manner wherein the third and fourth images can be seen when respectively viewed at third and fourth angles which are different from the first and second angles, the third image being essentially identical with that portion of the printed image that is overlaid by the decal so that the overlaid portion of the image appears to be visible through the window defined by the decal, the fourth image showing that portion of the article which is overlaid by the decal displaced in its entirety to a new position, repeated sequential views of the third and fourth images producing an optical effect which demonstrates the other of the flexure and tilting action possible with the article enclosed in the package.

4. A method of packaging a product comprising the steps of:

printing an image of the product which is enclosed in the package on a surface of the package;

placing a holographic decal which has a first holographic layer over a portion of the image;

using the decal to generate first and second images which appear to be enlargements of the portion of the image over which the decal is disposed;

configuring the decal so that the first image appears as an enlarged depiction of the portion of the image which is covered by the decal in a first state;

configuring the decal so that the second image appears as an enlarged depiction of the portion of the image which is covered by the decal in a second state which is different from the first state and wherein a positional relationship of at least one element of the second image has occurred with respect to a position of that element in the first image.

5. A method as set forth in claim 4, further comprising the steps of:

configuring the holographic decal to have a second holographic layer which overlays the first holographic layer;

configuring the second holographic layer to generate third and fourth images which are different from the first and second images and which are viewable at third and fourth angles which are different from the first and second angles at which the first and second images produced by the first holographic layer are viewable;

configuring the third and fourth images so that they depict a movement of an element or elements which is different from the movement which appears from sequential viewings of the first and second images.

\* \* \* \* \*